United States Patent
Mullenaux et al.

(10) Patent No.: US 12,205,432 B2
(45) Date of Patent: Jan. 21, 2025

(54) LIQUID FILLING AND DISPENSING METHOD

(71) Applicant: AQUAPHANT INC., Las Vegas, NV (US)

(72) Inventors: Thomas Cody Mullenaux, Rolling Hills, CA (US); Mark W. J. Kelly, Laguna Beach, CA (US)

(73) Assignee: AQUAPHANT INC., Las Vegas, NV (US)

( * ) Notice: Subject to any disclaimer, the term of this patent is extended or adjusted under 35 U.S.C. 154(b) by 170 days.

(21) Appl. No.: 17/808,136

(22) Filed: Jun. 22, 2022

(65) Prior Publication Data

US 2022/0335771 A1  Oct. 20, 2022

Related U.S. Application Data

(63) Continuation-in-part of application No. 17/651,658, filed on Feb. 18, 2022, now Pat. No. 11,932,527, which is a continuation-in-part of application No. 17/451,131, filed on Oct. 15, 2021, now abandoned, which is a continuation-in-part of application No. 17/380,178, filed on Jul. 20, 2021, now Pat. No. 11,738,986, which is a continuation-in-part of application No. 17/176,350, filed on Feb. 16, 2021, now Pat. No. 11,672,367.

(51) Int. Cl.
*G07F 13/00* (2006.01)
*G05B 19/042* (2006.01)
*G06K 7/10* (2006.01)
*B65D 1/06* (2006.01)

(52) U.S. Cl.
CPC .......... *G07F 13/00* (2013.01); *G05B 19/042* (2013.01); *G06K 7/10366* (2013.01); *B65D 1/06* (2013.01); *G05B 2219/2645* (2013.01)

(58) Field of Classification Search
CPC .......... B67D 1/06; B67D 1/0042; B67D 7/04
USPC .................................................. 141/83, 113
See application file for complete search history.

(56) References Cited

U.S. PATENT DOCUMENTS

| | | | |
|---|---|---|---|
| 4,712,709 A * | 12/1987 | Horvath | B60K 15/04 141/113 |
| 8,176,948 B2 * | 5/2012 | Carrig | H04W 4/08 141/82 |
| 8,768,505 B2 * | 7/2014 | Thompson | G06Q 30/06 700/240 |
| 9,561,451 B2 | 2/2017 | Skywell | |
| 9,607,464 B2 * | 3/2017 | McQuade | G06Q 20/382 |
| 10,405,670 B1 | 9/2019 | Mullenaux | |
| 10,513,213 B1 | 12/2019 | Mullenaux | |
| 10,626,581 B1 | 4/2020 | Mullenaux | |
| 10,994,978 B1 | 5/2021 | Mullenaux | |
| 11,066,286 B1 | 7/2021 | Mullenaux | |

(Continued)

*Primary Examiner* — Timothy L Maust
(74) *Attorney, Agent, or Firm* — SHIMOKAJI IP

(57) ABSTRACT

A liquid filling and dispensing method comprises determining whether a user account is valid; if the user account is valid: enabling a user to obtain operating parameters of a processing assembly configured to collect and transfer liquid to a filling assembly; enabling the user to find a fill location having the filling assembly, wherein the fill assembly is configured to fill a validated container with liquid; and enabling the user to initiate filling of the container with the liquid at the filling assembly.

12 Claims, 18 Drawing Sheets

(56) References Cited

U.S. PATENT DOCUMENTS

| | | | |
|---|---|---|---|
| 2014/0053944 A1* | 2/2014 | Wang | H04L 67/535 |
| | | | 141/94 |
| 2014/0110018 A1* | 4/2014 | Scarvelli | B67D 1/0891 |
| | | | 141/64 |
| 2018/0339682 A1* | 11/2018 | Hall | G06Q 20/145 |
| 2021/0283529 A1 | 9/2021 | Aquaphant | |
| 2021/0301506 A1 | 9/2021 | Aquaphant | |

\* cited by examiner

|          |                 |                 | ↙ 401           |
|          |                 |                 | AccountDB       |
| Key      | 1               | 2               | 3               |
| userID   | 1               | 2               | 3               |
| passID   | 1               | 2               | 3               |
| cardID   | 1               | 2               | 3               |
| bottleID | 1               | 2               | 3               |
| awgID    | 0xF4CFA28DE8D4  | 0xFEBB073AA8D4  | 0x09FF45B3C1DA  |
| awgStatus| 1               | 1               | 1               |
| healthID | 1               | 2               | 3               |

FIG. 6A

| | UserDB | | |
|---|---|---|---|
| Key | 1 | 2 | 3 |
| userID | 1 | 2 | 3 |
| firstname | Mark | DEF | GHI |
| lastname | ABC | Mullenaux | Wolf |
| addr1 | 123 Main st | 123 Main st | 123 Main st |
| addr2 | | | |
| city | Newport Beach | Long Beach | Las Vegas |
| state | CA | CA | NV |
| zip | 92660 | 90712 | 89130 |
| phone | 1234567890 | 1234567890 | 1234567890 |
| email | ABC@aquaphant.com | DEF@aquaphant.com | GHI@aquaphant.com |
| passID | 1 | 2 | 3 |
| date_created | 04/21/2022 13:43:56 | 03/01/2022 09:31:12 | 04/21/2022 13:43:56 |
| status | 1 | 1 | 1 |

| PassDB | | | |
|---|---|---|---|
| Key | 1 | 2 | 3 |
| passID | 1 | 1 | 2 |
| status | 1 | 1 | 1 |
| pass_id | ABC | DEF | GHI |
| last_activity_date | 04/21/2022 13:43:56 | 03/01/2022 09:31:12 | 04/21/2022 13:43:56 |
| expire_date | 07/13/2022 | 06/26/2022 | 08/01/2022 |

FIG. 6C

| CCardDB | | | |
|---|---|---|---|
| Key | 1 | 2 | 3 |
| userID | 1 | 1 | 2 |
| status | 1 | 2 | 1 |
| token_id | 123 | 456 | 789 |
| card_id | 123 | 456 | 789 |
| card_type | visa | mastercard | visa |
| last_activity_date | 04/21/2022 13:43:56 | 03/01/2022 09:31:12 | 04/21/2022 13:43:56 |
| expire_date | 01/31/2025 | 03/30/2024 | 10/31/2026 |

| | | | | Transaction_LogDB |
|---|---|---|---|---|
| Key | | 1 | 2 | 3 |
| userID | | 1 | 1 | 1 |
| cardID | | 2 | 2 | 2 |
| locationID | | 1 | 2 | 1 |
| transactionType | | fill | fill | fill |

| | | | BottleDB |
|---|---|---|---|
| Key | 1 | 2 | 3 |
| userID | 1 | 2 | 3 |
| rfid_code | 01213289235245 | 10102314984231 | 01213289189108 |
| bottle_type | R1 | R1 | R2 |
| fill_cap | 14.5 | 14.5 | 19.5 |
| status | 1 | 0 | 2 |

FIG. 6F

ConsumeDB

| Key | 1 | 2 | 407 |
|---|---|---|---|
| userID | 1 | 2 | 3 |
| transdate | 04/21/2022 13:43:56 | 03/01/2022 09:31:12 | 04/21/2022 13:43:56 |
| consume | 16 | 16 | 20 |

FIG. 6G

HealthDB

| Key | 1 | 2 | 408 |
|---|---|---|---|
| userID | 1 | 2 | 3 |
| transdate | 04/21/2022 13:43:56 | 04/27/2022 09:31:12 | 05/01/2022 13:43:56 |
| consumeID | 1 | 2 | 3 |
| healthID | 0xBH657899BB01 | GH-0136658 | GH-0136658 |
| healthName | Apple Health | Google Health | Google Health |
| url | https://www.apple.com/ios/health/ | https://health.google/ | https://health.google/ |

FIG. 6H

| | | | Fill_LocationsDB ←409 |
|---|---|---|---|
| Key | 1 | 2 | 3 |
| locnID | 1 | 2 | 3 |
| locnname | restaurant_123438 | hotel_77698657 | hotel_88998655 |
| locn_displayname | Ginas Pizza - Oak Street | Roof Top Lounge | Mirage Las Vegas |
| ownerID | 1 | 2 | 3 |
| addr1 | 2 Oak St | 1289 S Coast Hwy | 3400 S Las Vegas Blvd |
| addr2 | | | |
| city | Laguna Beach | Laguna Beach | Las Vegas |
| state | CA | CA | NV |
| zip | 92651 | 92651 | 89109 |
| status | 1 | 1 | 0 |
| locn_lat | 33.53407439 | 33.53245473 | 36.12029437 |
| locn_long | -117.77767854 | -117.77759616 | -115.1765948 |

FIG. 6I

LIQUID FILLING AND DISPENSING METHOD

CROSS-REFERENCE TO RELATED APPLICATIONS

This application is a continuation-in-part of, and claims priority to and the benefit of, U.S. patent application Ser. No. 17/651,658, filed Feb. 18, 2022; which is a continuation-in-part of U.S. patent application Ser. No. 17/451,131, filed Oct. 15, 2021; which is a continuation-in-part of U.S. patent application Ser. No. 17/380,178, filed Jul. 20, 2021; which is a continuation-in-part of U.S. patent application Ser. No. 17/176,350, filed Feb. 16, 2021, all of which are incorporated herein in their entirety.

BACKGROUND OF THE DISCLOSURE

The present disclosure generally relates to liquid systems and, more particularly, to methods of filling and dispensing liquid in a container.

Consumers often avoid drinking water from the tap. Accordingly, consumers frequently purchase pre-filled bottles of water. The bottles are often made of plastic and discarded after a single use. That contributes to environmental waste which does not quickly degrade. Also, the consumer must travel to a store to purchase more plastic bottles of water.

When the consumer is in a rented space, such as a hotel room or even vehicle, bottled water is often provided for a charge. However, the owner of the space may need to constantly replenish the bottles of water and discard the used bottles. At the same time, the owner may need to track the number of consumed bottles of water and charge the consumer accordingly.

As can be seen, there is a need for improved methods to fill and dispense liquid.

SUMMARY OF THE DISCLOSURE

In one aspect of the present disclosure, a liquid filling and dispensing method comprises determining whether a user account is valid; if the user account is valid: enabling a user to obtain operating parameters of a processing assembly configured to collect and transfer liquid to a filling assembly; enabling the user to find a fill location having the filling assembly, wherein the fill assembly is configured to fill a validated container with liquid; and enabling the user to initiate filling of the container with the liquid at the filling assembly.

In another aspect of the present disclosure, a non-transitory computer-readable storage medium storing instructions which, when executed by a computer processor, cause the computer processor to perform a liquid filling and dispensing method, and comprises enabling a user to find a fill location having a filling assembly, wherein the fill assembly is configured to fill a container with liquid; and enabling the user to initiate filling of the container, from a bottom area thereof, with the liquid at the filling assembly.

In a further aspect of the present disclosure, a computer implemented method for liquid filling and dispensing comprises enabling a validated user to select a user action among: finding a fill location having a filling assembly, wherein the fill assembly is configured to fill a validated container with liquid; and initiating the filling of the container, from a bottom area thereof, with the liquid at the filling assembly.

These and other features, aspects and advantages of the present disclosure will become better understood with reference to the following drawings, description, and claims.

BRIEF DESCRIPTION OF THE DRAWINGS

FIGS. 6A-6I are databases according to an exemplary embodiment of the present disclosure.

DETAILED DESCRIPTION OF THE DISCLOSURE

Figure 1:
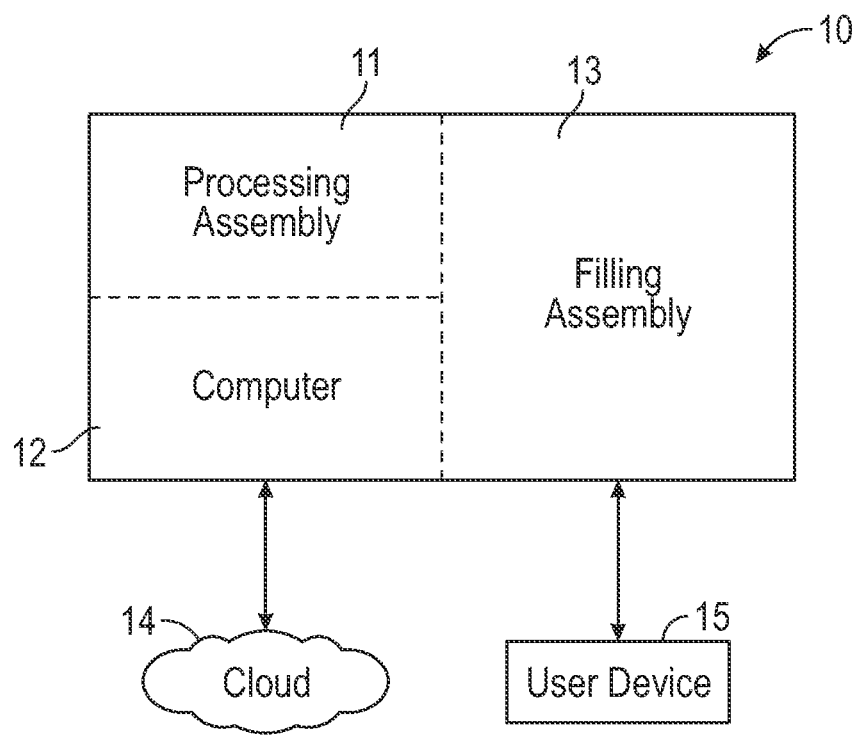
FIG. 1 is a schematic diagram of a liquid filling and dispensing system according to an exemplary embodiment of the present disclosure.

The following detailed description is of the best currently contemplated modes of carrying out the disclosure. The description is not to be taken in a limiting sense, but it is merely for the purpose of illustrating the general principles of the disclosure, since the scope of the disclosure is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As used herein, the terms "embodiment" and "embodiments" are intended to be used interchangeably. In other words, the singular includes the plural, and vice versa.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "assembly," or "system". Furthermore, aspects of the present disclosure may take the form of a computer program product embodied in one or more computer readable media having computer readable program code embodied thereon.

Any combination of one or more non-transitory computer readable storage media may be utilized. A non-transitory computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A non-transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a non-transitory computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Here, the technical problems to be solved are that environmental waste is created from plastic containers having liquids for human consumption. In various vendor-consumer environments, the provision of liquid in plastic containers needs to enable only paying consumers to obtain containers of liquid.

Broadly, the present disclosure solves the foregoing problems by providing apparatus and methods for filling and dispensing liquid, such as water, for human consumption. In the present disclosure, liquid may be stored and then pumped to a filling assembly. The present disclosure may enable the easy and quick attachment/detachment of a container (e.g., bottle) to a filling assembly, whereby the container can be filled with liquid and then removed for liquid consumption. In embodiments, the container can be reusable. The present disclosure may determine—via a verification subassembly—whether the container is valid. If valid, and based on stored characteristics of the container, the present disclosure may fill the container with liquid. The present disclosure may enable a user to have an account which can be monetarily charged each time a container is filled.

FIG. 1 is a schematic diagram of an exemplary embodiment of a liquid filling and dispensing system 10. In exemplary embodiments, the system 10 may be in a vehicle, in a hotel room, in a restaurant, or in other environments such as where the controlled dispensing of liquid into a container is desired.

In an embodiment, the system 10 may include a processing assembly 11 which operatively communicates with a filling assembly 13 and with a computer 12 (i.e., a CPU/processor/controller/database). In an embodiment, the computer 12 may be separate from the processing assembly 11 and separate from the filling assembly 13. Or, in an embodiment, the computer 12 may be a part of the processing assembly 11 or a part of the filling assembly 13. In an embodiment, the computer 12 may store information in a cloud 14, or locally.

According to an embodiment, a user device 15—such as a desktop, a laptop, mobile phone, or computer—may communicate with the system 10—wirelessly or wired. For example, the user device 15 may initiate a start of the processing assembly 11, initiate a start of the filling assembly 13, and/or initiate a creation of a user account as further described below.

In an embodiment, the processing assembly 11 may provide a processing of liquid that can be transported to the filling assembly 13. In embodiments, the liquid may be water. In other embodiments, the liquid may be a drink suitable for human consumption, such as juice, soda or coffee.

The processing assembly 11 may, in an embodiment, be configured to store and pump a liquid among tanks and filters. In an embodiment, the processing assembly 11 may be further configured to pump the liquid to the filling assembly 13. The filling assembly 13 may determine whether a container is valid or not. If valid, according to an embodiment, the filling assembly 13 may then use stored characteristics of the container to fill the container with liquid, such as water.

Figure 2:
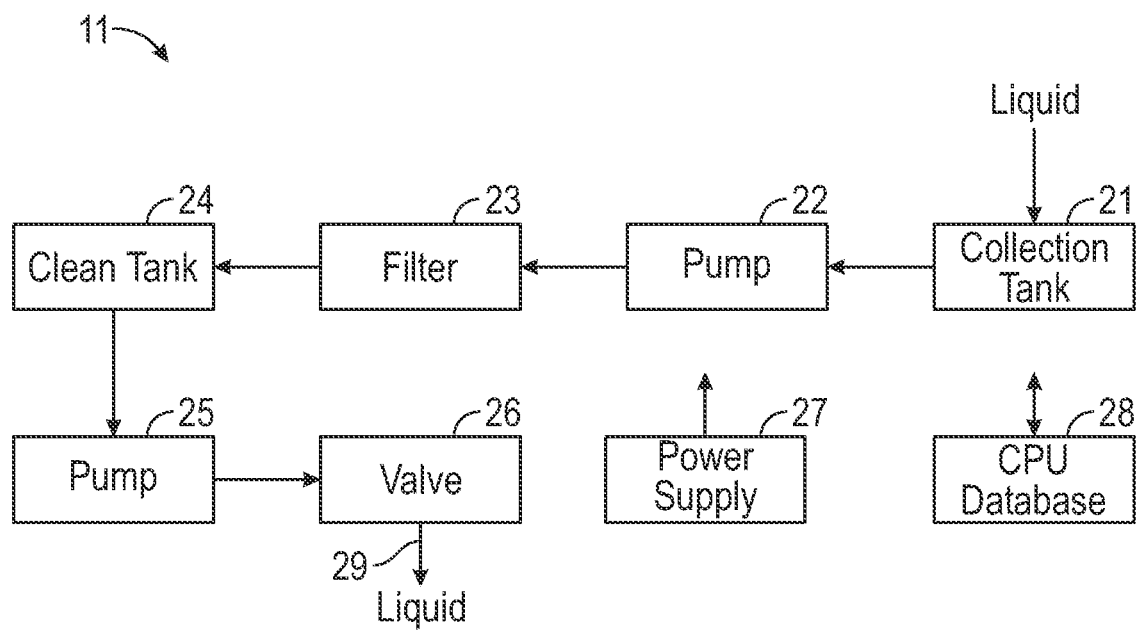
FIG. 2 is a schematic diagram of a processing assembly according to an exemplary embodiment of the present disclosure.

FIG. 2 is a schematic diagram of an exemplary embodiment of the processing assembly 11. The processing assembly 11 may, in an embodiment, collect liquid in a collection tank 21. From the collection tank 21, a pump 22 may pump the liquid through a filter 23 to remove particulates and/or contaminants, for example. The filtered liquid from the filter 23 may move into a clean tank 24, according to an embodiment. A pump 25 may then pump the filtered liquid from the clean tank 24 and through a valve 26 to produce a consumable liquid 29, in an embodiment. From the valve 26, the consumable liquid 29 may be transferred to the filling assembly 13.

The processing assembly 11 may, in embodiments, include a power supply 27 that may supply power to one or more of the components in the assembly 11, such as the pumps 22, 25. In embodiments, the processing assembly 11 may also include a computer 28 (i.e., CPU/processor/controller/database) to communicate with and control the operation of one or more of the components in the assembly 11. In another embodiment, the computer 12 may communicate with and control the operation of one or more of the components in the assembly 11. In an embodiment, the computers 12, 28 may store information in the cloud 14, or locally.

In embodiments, the computer/controller 12, 28 may be configured to determine whether the collection tank 21 is empty (e.g., via a sensor in the tank 21) and/or to start/stop operation of one or more of the components in the processing assembly 11.

In an embodiment where the liquid is water, the processing assembly 11 may acquire humidified air from an environment outside of the system 10, such as the air inside and/or outside of a vehicle. The processing assembly 11 may be further configured to condense water from the humidified air (i.e., dehumidify the humidified air). According to an embodiment, the processing assembly 11 may also be configured to filter the humidified air and/or filter the condensed water. The foregoing is further described in U.S. patent application Ser. No. 17/451,131, filed Oct. 15, 2021, which is incorporated herein in its entirety.

Figure 3:
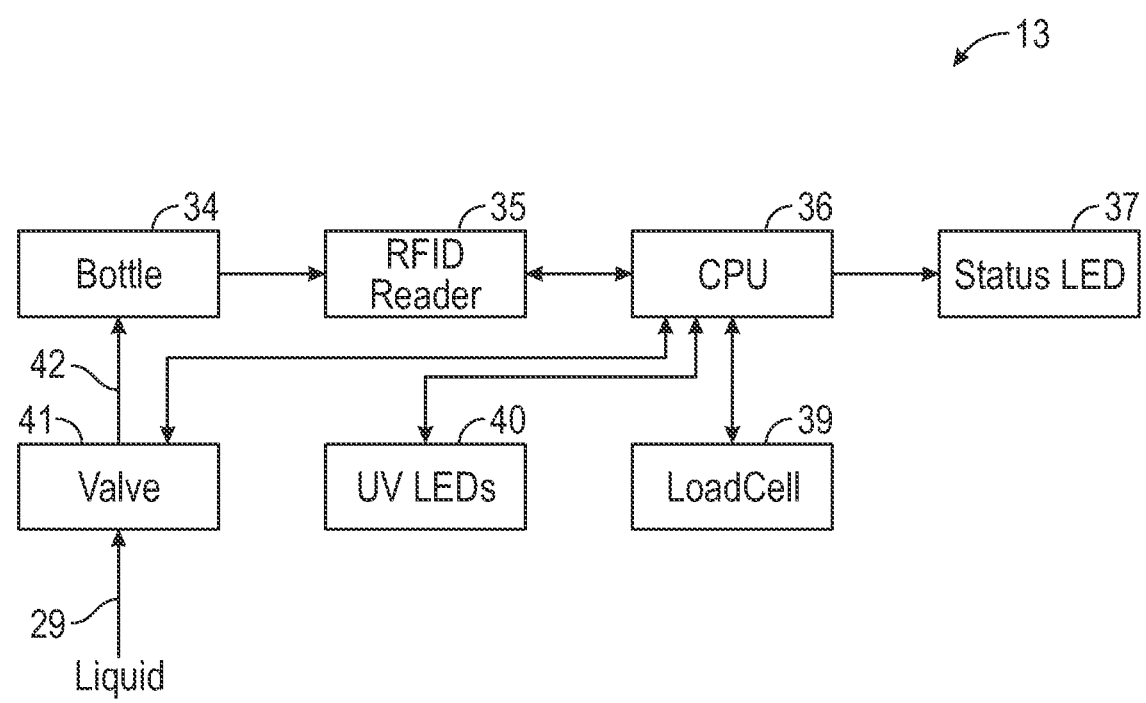
FIG. 3 is a schematic diagram of a filling assembly according to an exemplary embodiment of the present disclosure.

FIG. 3 is a schematic diagram of an exemplary embodiment of the filling assembly 13. In embodiments, the filling assembly 13 may have a verification subassembly which may include an RFID reader 35 that may read an RFID tag on a container 34 to be filled with liquid. A status LED 37 may indicate the filling status of the assembly 13. The filling assembly 13 may further include a weighing subassembly which may include a load cell 39 that may weigh a container 34 that is empty or full of liquid or partially full of liquid. A UV-LED 40 may be included in the filling assembly 13, in an embodiment, and which can destroy bacteria and the like before liquid enters the container 34. In an embodiment, a valve 41 may receive liquid 29 from the processing assembly 11 and a liquid line 42 may direct the liquid into the container 34.

In the filling assembly 13, according to an embodiment, a computer 36 (i.e., CPU/processor/controller/database) may communicate with and control one or more of the other components in the filling assembly 13. In another embodiment, the computer 12 may communicate with and control one or more of the components in the filling assembly 13. In an embodiment, the computers 12, 36 may store information in the cloud 14, or locally.

Figure 4A:
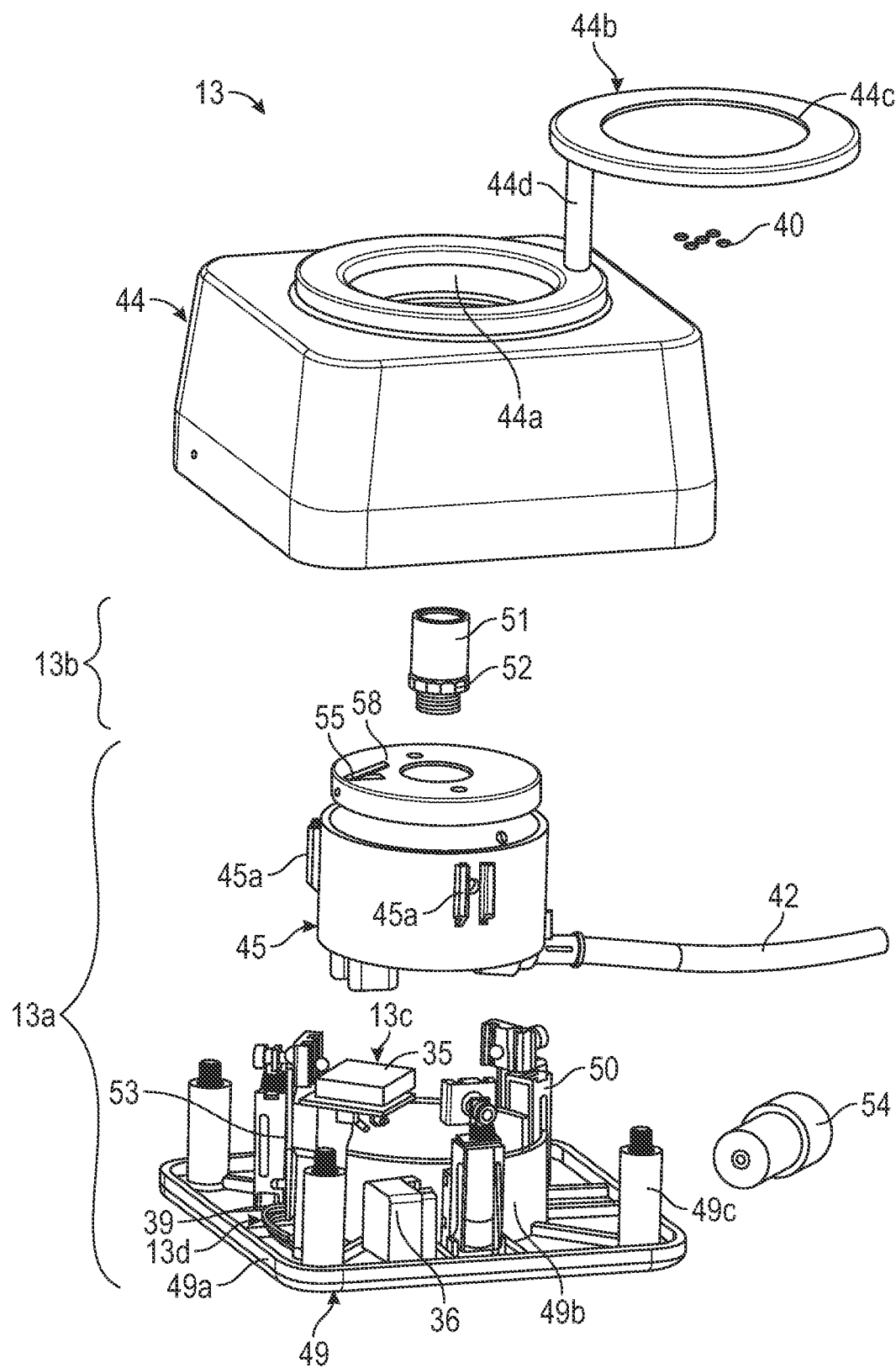
FIG. 4A is an exploded view of a filling assembly according to an exemplary embodiment of the present disclosure.

FIG. 4A is a partial, exploded view of a filling assembly 13, according to an exemplary embodiment. The filling assembly 13 may include a base subassembly 13a, a connection subassembly 13b, a verification subassembly 13c, a weighing subassembly 13d, and a cover 44 to house the foregoing subassemblies, in an embodiment.

According to an embodiment, the cover 44 may have an aperture 44a therein, wherein the aperture 44a can be positioned operatively adjacent to and receive the container 34 to be filled with liquid, according to an embodiment. The cover 44 may include a lid 44b, in an embodiment, which may include a planar element 44c which can rotate about a post element 44d. In an embodiment, the filling assembly 13 (e.g., the base subassembly 13a) may move the lid 44b over the aperture 44a when the filling assembly 13 is not in use and may move the lid 44b to expose the aperture 44a when the filling assembly 13 is in use.

In an embodiment, one or more UV-LEDs 40 can be supported by the cover 44. One or more of the UV-LEDs 40 may be disposed at a side of the planar element 44c which interfaces the aperture 44a, according to an embodiment. As noted above, the one or more UV-LEDs may destroy bacteria and the like before liquid enters the container 34.

In FIG. 4, according to an embodiment, the base subassembly 13a can be configured to receive liquid from the processing assembly 11. In an embodiment, the base subassembly 13a may include a container holder 45 which can be configured to receive and hold the container 34, such as at a bottom area thereof. In an embodiment, the container holder 45 can be cup shaped. In an embodiment, the container holder 45 may include one or more receiving slots or elements 45a which, for example, may be positioned about an exterior cylindrical surface of the container holder 45. One or more of the receiving slots 45a may be configured to receive at least a part of the connection subassembly 13b as described below.

The base subassembly 13a may include a liquid line 42 that may transport liquid from the processing assembly 11 to the base subassembly 13a, according to an embodiment. In an embodiment, the liquid line 42 may extend into the container holder 45, such as through a bottom area of the container holder 45 and eventually attach to the connection subassembly 13b, as described below.

In an embodiment, the base subassembly 13a may include a base plate 49. The base plate 49, in an embodiment, may have a planar bottom element 49a at a bottom thereof, a cup shaped element 49b affixed on the bottom element 49a, and one or more post elements 49c affixed on the bottom element 49a and which may be disposed near and/or along a perimeter of the bottom element 49a. The cup shaped element 49b may be configured to receive and hold the container holder 45, in an embodiment. The one or more post elements 49c may support the cover 44 over the base plate 49, in an embodiment.

Figure 4B:
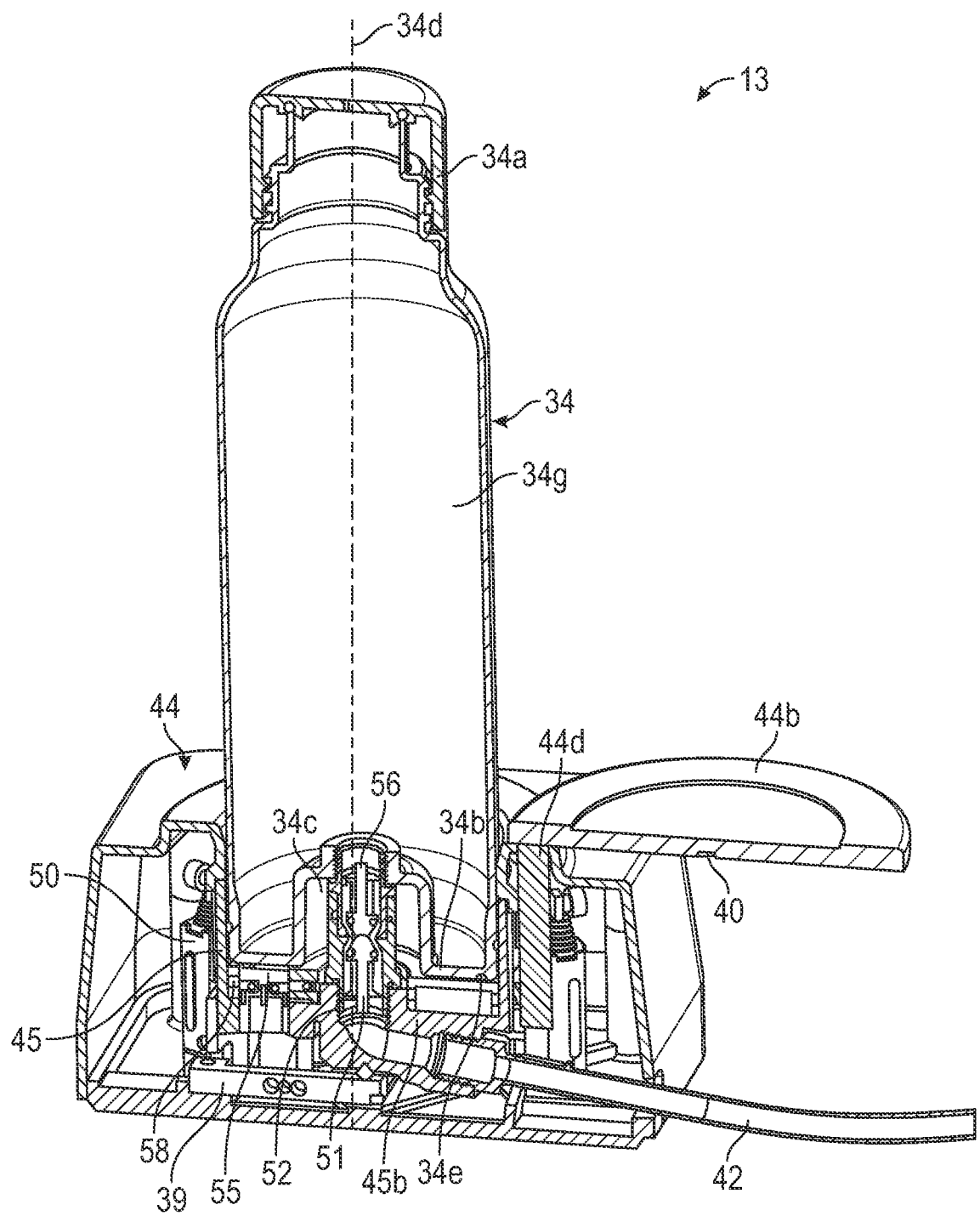
FIGS. 4B-4C are cross sectional views of a filling assembly according to an exemplary embodiment of the present disclosure.

In FIG. 4A, the base subassembly 13a, such as the bottom element 49a of the base plate 49, may support thereon at least a portion of the connection subassembly 13b, according to an embodiment. In an embodiment, the base subassembly 13a may be configured to enable the connection subassembly 13b to move in a direction parallel to a longitudinal axis 34d of the container 34 (FIG. 4B).

In an embodiment, the bottom element 49a of the base plate 49 may support one or more solenoids 50 in an upright orientation and which solenoids 50 form a part of the connection subassembly 13b. In an embodiment, the one or more solenoids 50 may be positioned outside of and about the cup shaped element 49b of the base plate 49. In an embodiment, the one or more solenoids 50 may operatively interface the one or more slots 45a on the container holder 45.

In an embodiment, the base subassembly 13a may include a base connector 52. The base connector 52 may, in an embodiment, connect to and enable liquid communication between the connection subassembly 13b and the liquid line 42.

In FIG. 4A, according to an embodiment, the base subassembly 13a, such as the bottom element 49a of the base plate 49, may support thereon at least a portion of the weighing subassembly 13d. In an embodiment, the weighing subassembly 13d may include a load cell 39 and an interface board 53 to control the former. In an embodiment, the load cell 39 may be positioned within the cup shaped element 49b of the base plate 49, while the interface board 53 may be positioned outside of the cup shaped element 49b.

In an embodiment, the base subassembly 13a, such as the cup shaped element 49b of the base plate 49, may support thereon at least a portion of the verification subassembly 13c. The verification subassembly 13c may include the RFID reader 35.

In an embodiment, the base subassembly 13a may include the computer 36 described above. The base subassembly 13a may further include a motor/gearbox 54 which can rotate the cover lid 44b over and away from the cover aperture 44a. In an embodiment, as described below, when the fill assembly 13 is in a fill position/state, the motor/gearbox 54 may be initiated, via the computer 36, to move the cover lid 44b away from the cover aperture 44a. In an embodiment, when the fill assembly 13 is in a non-fill position/state, the motor/gearbox 54 may be initiated, via the computer 36, to move the cover lid 44b over from the cover aperture 44a.

In FIG. 4A, the connection subassembly 13b may include a first coupling 51, in an embodiment. The first coupling 51 may be a female coupling that can be configured to releasable mate/connect with a second coupling (e.g., male coupling) of the connection subassembly 13b, though not shown in FIG. 4A.

In FIG. 4B, a cross section of the filling assembly 13 is shown. The filling assembly 13 may include a container 34 configured to receive liquid from the base subassembly 13a. In an embodiment, the container 34 can have a body portion 34g, a cap 34a configured to fit at one end (i.e., top area) of the body portion 34g and enable consumption of liquid therein, and a bottom portion or area 34b at an opposite end (i.e., top area) of the body portion 34g. In an embodiment, the bottom area 34b may be configured to provide a receiving portion or void space 34c on an exterior of the container 34. According to an embodiment, the container 34 may extend along the longitudinal axis 34d. The container 34 may further include an RFID tag 34e, such as on an exterior surface of the bottom area 34b of the container 34. The RFID tag 34e may, in an embodiment, contain information about the container 34 and/or a user.

As shown in FIG. 4B, the container 34 may be placed in a fill position/state, such as by the user. In an embodiment, the user may insert the container 34, such as the bottom area 34b thereof, into the container holder 45. A force of gravity on the container 34 may occur as the user releases the container 34 into the container holder 45. The force of gravity may be parallel to the longitudinal axis 34d, depending on the orientation of the filling assembly 13. Herein, the term "parallel" is intended to mean "exactly parallel", as well as "generally parallel" or "substantially parallel."

Also, in an embodiment, an applied force may be created on the container 34 in the fill position/state. The applied force may be external to the filling assembly 13 and result from the user pushing down on the container 34 towards the container holder 45, according to an embodiment. The externally applied force can be parallel to the longitudinal axis 34d of the container 34, according to an embodiment.

The connection subassembly 13b can be activated, according to an embodiment, as or upon the container 34 being placed in the fill position. The connection subassembly 13b may be configured to releasably connect/mate the container 34 with the base subassembly 13a, in an embodiment. The connection subassembly 13b may also be configured to releasably connect/mate, as above, by an applied force(s) that is (are) perpendicular or parallel to the longitudinal axis 34d of the container 34, in an embodiment. Herein, the term "perpendicular" is intended to mean "exactly perpendicular", as well as "generally perpendicular" or "substantially perpendicular".

Accordingly, in an embodiment, the connection subassembly 13b may be configured to releasably connect/mate, as above, by two forces that are orthogonal to one another. The connection subassembly 13b may be configured to transport liquid in only one direction therein—from the base subassembly 13a to the container 34—in an embodiment. The connection subassembly 13b may also be configured to create a liquid pressure differential therein.

In FIGS. 4A-4B, according to an embodiment, the connection subassembly 13b may include a microswitch holder 58 which, for example, may be donut shaped. The microswitch holder 58 may support one or more microswitches 55, in an embodiment. The microswitch holder 58 and the microswitch(es) 55 may be disposed in the container holder 45, in an embodiment.

The one or more microswitches 55 may be configured and disposed to sense the presence of the container 34, in an embodiment. For example, the one or more of the microswitches 55 may be positioned in the container holder 45. When the bottom area 34b of the container 34 contacts one or more of the microswitches 55, the one or more microswitches 55 may send a signal to the computer 36 indicating the presence of the container 34, in an embodiment. The computer 36 may, in turn, then activate other components of the fill assembly 13, such as the one or more solenoids 50. In an embodiment, the computer 36 may, in turn, be configured to activate one or more of the components in the processing assembly 11.

Similarly, according to an embodiment, the one or more microswitches 55 may be configured to sense the absence of the container 34. In such a situation, the one or more microswitches 55 may not send a signal to the computer 36. The computer 36 may, in turn, be configured to prevent the activation of one or more of the components in the fill assembly 13 and/or the processing assembly 11.

In FIG. 4B, according to embodiments, the connection subassembly 13b can include a first coupling 51 and a second coupling 56. The first and second couplings 51, 56 may be configured to couple and decouple by a friction fit, according to an embodiment. The first and second couplings 51, 56 may, in embodiments, be male and female couplings.

In an embodiment, the first coupling 51 may be a female coupling and the second coupling 56 may be a male coupling.

An embodiment of a first and second coupling 51, 56 herein is further described in U.S. patent application Ser. No. 17/451,131, filed Oct. 15, 2021, which is incorporated herein in its entirety.

Referring still to FIG. 4B, in an embodiment, the first coupling 51 may be attached to either the container 34 or the base subassembly 13a, while the second coupling 56 may be attached to the other of the container 34 and the base assembly 13a. In the fill position/state, according to an embodiment, when the first and second couplings 51, 56 can be releasably connected to one another, the couplings 51, 56 may create a liquid pressure differential therein, according to an embodiment. The pressure differential may result from pressurized liquid entering one of the couplings (e.g., the first coupling 51) and pressurized liquid exiting the other of the couplings (e.g., the second coupling 56) and into the container 34, according to an embodiment. In embodiments, pressure of the liquid entering the coupling 51 can be higher than the pressure of the liquid exiting the coupling 56. In an embodiment, the higher pressure of the liquid entering the coupling 56 may be due to the liquid being pumped from the processing assembly 11. In an embodiment, the lower pressure of the liquid exiting the coupling 56 may be due to a low liquid pressure in the container 34.

The connection subassembly 13b can be disconnected or inactivated, according to an embodiment, as or upon the container 34 being removed from the fill position to the non-fill position wherein liquid is not entering the container 34. In an embodiment, as the user removes the container 34 from the stationary container holder 45, the first and second couplings 51, 56 may decouple. In an embodiment, the decoupling may occur due to the loss of friction fit between the first coupling 51 and the second coupling 56.

Upon decoupling, liquid can be prevented from passing from one coupling to another, such as from the first coupling 51 to the second coupling 56, in an embodiment. Also, upon decoupling, the coupling 51 or 56 attached to the container 34 is configured to prevent liquid from exiting the container 34 through such coupling.

In FIGS. 1 and 4A, the verification subassembly 13c can include the RFID reader 35 adjacent the container holder 45 and the RFID tag 34e on the container 34, according to an embodiment. When the container 34 is operatively near or in the container holder 45, the reader 35 may read the tag 34e, in an embodiment. When read, the computer 36 may determine whether the container 34 is valid or not. In other words, determine whether the user has a valid user account and/or whether the container 34 is an authorized (i.e., valid) container to be filled with liquid.

Figure 4C:
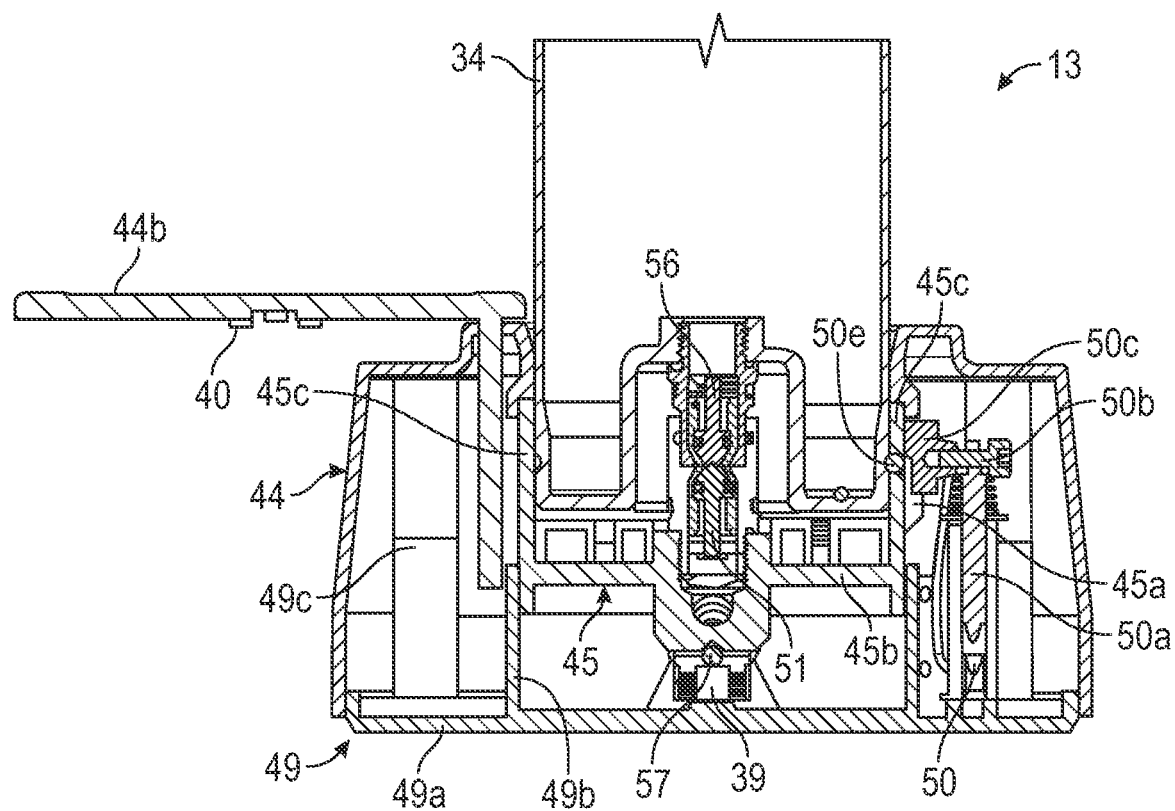

In FIG. 4C, a partial cross section of the filling assembly 13 is shown. In an embodiment, the container holder 45 may include a bottom portion or area 45b and an upstanding wall 45c extending perpendicular therefrom. One or more apertures 45d may be in the wall 45c, according to an embodiment.

The connection subassembly 13b may be configured to impart an applied force that can be perpendicular to the longitudinal axis 34d of the container 34, according to an embodiment. The applied force can be from the one or more solenoids 50, in an embodiment. Each solenoid 50 can include a post element 50a arranged lengthwise in a direction parallel to the longitudinal axis 34d. An attachment element 50b may be supported at one end of the post element 50a, in an embodiment. The attachment element 50b may, in turn, support an insertion element 50c.

In an embodiment, the insertion element 50c may be configured to be inserted into a receiving slot 45a on the upstanding wall 45c of the container holder 45. Further, the insertion element 50c may be configured with a recessed surface that interfaces the upstanding wall 45c to produce a gap between the insertion element 50c and the upstanding wall 45c.

In FIG. 4C, the connection subassembly 13b may include one or more ball bearings 50e and one or more races, according to an embodiment. In an embodiment, the ball bearing(s) 50e and the race(s) can be configured to interface the container 34 with the base assembly 13a. Each ball bearing 50e can be configured to fit in a respective aperture in the upstanding wall 45c. In an embodiment, the ball bearing 50e can be further configured to fit in the race. The race, in an embodiment, can be on an exterior surface of the container 34 and, in an embodiment, extend about a circumference of the container 34.

According to an embodiment, in the non-fill position before the container 34 is moved into the container holder 45, the ball bearing(s) 50e may remain in the aperture(s) of the upstanding wall 45c. At or around that time, the insertion element(s) 50c can be positioned whereby the recessed surface thereon leaves the gap at the position of the ball bearing 50e, in an embodiment. Thereby, there is little or no applied pressure on the ball bearing 50e in a direction perpendicular to the longitudinal axis 34d of the container 34.

In an embodiment, when the container 34 is moved into or near the container holder 45 to the fill position, the RFID reader 35 may read RFID tag 34e and thereby sense the presence of the container. Alternatively, or in addition, the one or more microswitches 55 may be depressed and sense the presence of the container 34. The RFID reader 35 and/or the one or more microswitches 55 may then signal the computer 36 to activate the one or more solenoid(s) 50, in an embodiment. Upon activation, the insertion element 50c may move to a position to eliminate the gap, according to an embodiment. By such gap elimination, the insertion element 50c can impart an applied force on the ball bearing 50e, in an embodiment. The applied force can be perpendicular to the longitudinal axis 34d of the container 34. In an embodiment, the applied force can move the ball bearing 50e into and/or against the race. That can enable the container 34 to be held in the container holder 45.

In FIGS. 4B-4C, the weighing subassembly 13d may include a load cell 39 in communication with a ball bearing 57, in an embodiment. The ball bearing 57 may be in continuous contact with the bottom 45b of the container holder 45—whether the container 34 is in the fill or non-fill position—according to an embodiment. Thus, when the container 34 is in the fill position in the container holder 45, the weight of the container 34 is transferred to the ball bearing 57 and then to the load cell 39, in an embodiment. The load cell 39 can read the weight of the container 34—before, during and after filling—and send the information to the computer 36.

In turn, the computer 36 may be configured to determine whether the container 34 is to be filled (completely or partially) or not, in an embodiment. The computer may be configured to determine whether the processing assembly 11 is to be activated or not, in an embodiment.

According to an embodiment, the computers 12 and/or 36 (i.e., the controllers) may be configured to identify a presence of the container 34 operatively adjacent to the filling assembly 13 (such as by reading RFID sensor 35 when the user moves the container 34 over or near the filling assembly 13), determine whether the RFID tag 34e on the container 34 is valid (such as by checking a database of valid RFID tags), and if the RFID tag is valid, activate a flow of liquid from the processing assembly 11 and/or the filling assembly 13 and into the container 34.

In an embodiment, the controllers 12 and/or 36 may be further configured to obtain physical characteristics of the container 34 (such as by checking a database of physical characteristics of containers having valid RFID tags), display instructions on a user device 15, initiate a reading of a weight of the container 34, determine whether a weight of the container 34 is in a valid weight range (such as by checking a database of valid weight ranges of valid containers), and determine whether the container 34 is full of liquid (such as by checking a database of weights of full containers).

In an embodiment, data relating to container identity, container physical characteristics, and container weight range may be stored in the database 12, in the cloud 14, or locally. In an embodiment, identity data may be data that relates a specific (i.e., valid) container 34 to a valid (i.e., authorized) user account. In an embodiment, physical characteristic data may relate to a type of the container, a size of the container, a volume capacity of the container, and/or an empty weight and/or a filled weight of a valid container associated with a valid user account. In an embodiment, weight range date may be data of a range of weights for a valid container—empty and filled.

In the foregoing embodiment, the controllers 12 and/or 36 may be further configured to identify a presence of the container 34 operatively adjacent to the filling assembly 13, determine whether an RFID tag 34e is valid, cause a load cell 39 to measure a weight of the container 34, compare the weight of the container with a valid weight range, and activate the processing assembly 11 and/or a valve 41 in the filling assembly 13.

In a further embodiment, the controllers 12 and/or 36 may be configured to determine whether an RFID tag 34e on a container 34 at the filling assembly 13 is valid, determine if there is a valid user account associated with the RFID tag, enable a valid user to purchase a fill of liquid, and activate the processing assembly 11 and/or initiate the filling assembly 13 to fill liquid into the container 34.

In the foregoing embodiment, the controllers 12 and/or 36 may be further configured to determine whether the system 10 is available to dispense liquid, identify a presence of the container 34 at the filling assembly 13, enable an invalid user to set up an account, process a purchase against an account of the valid user, disable the container 34 in an account of the valid user, and provide a receipt of the purchase to the valid user.

Figure 5A:
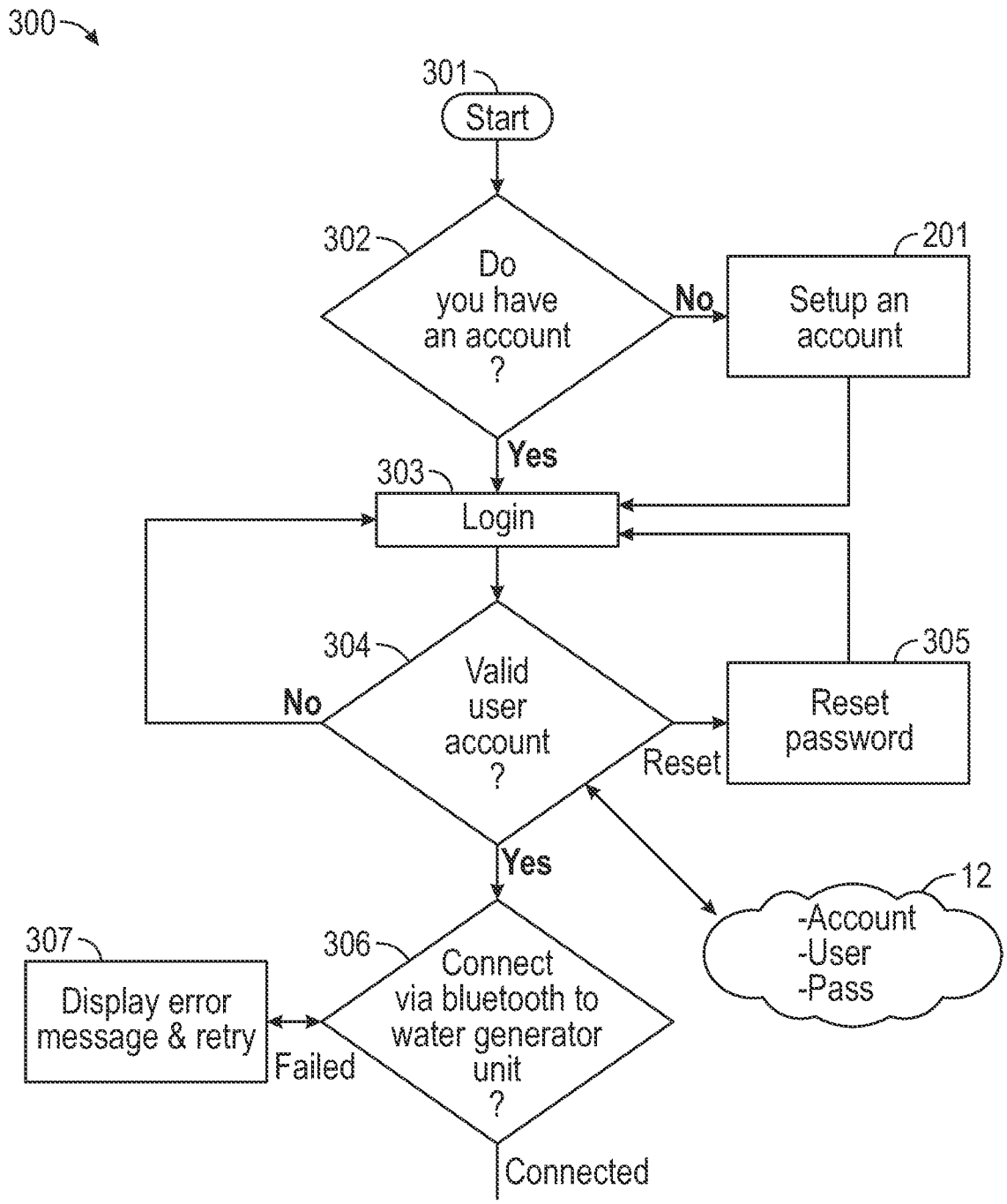
FIGS. 5A-5B are flow charts depicting a mobile application according to an exemplary embodiment of the present disclosure.
Figure 5B:
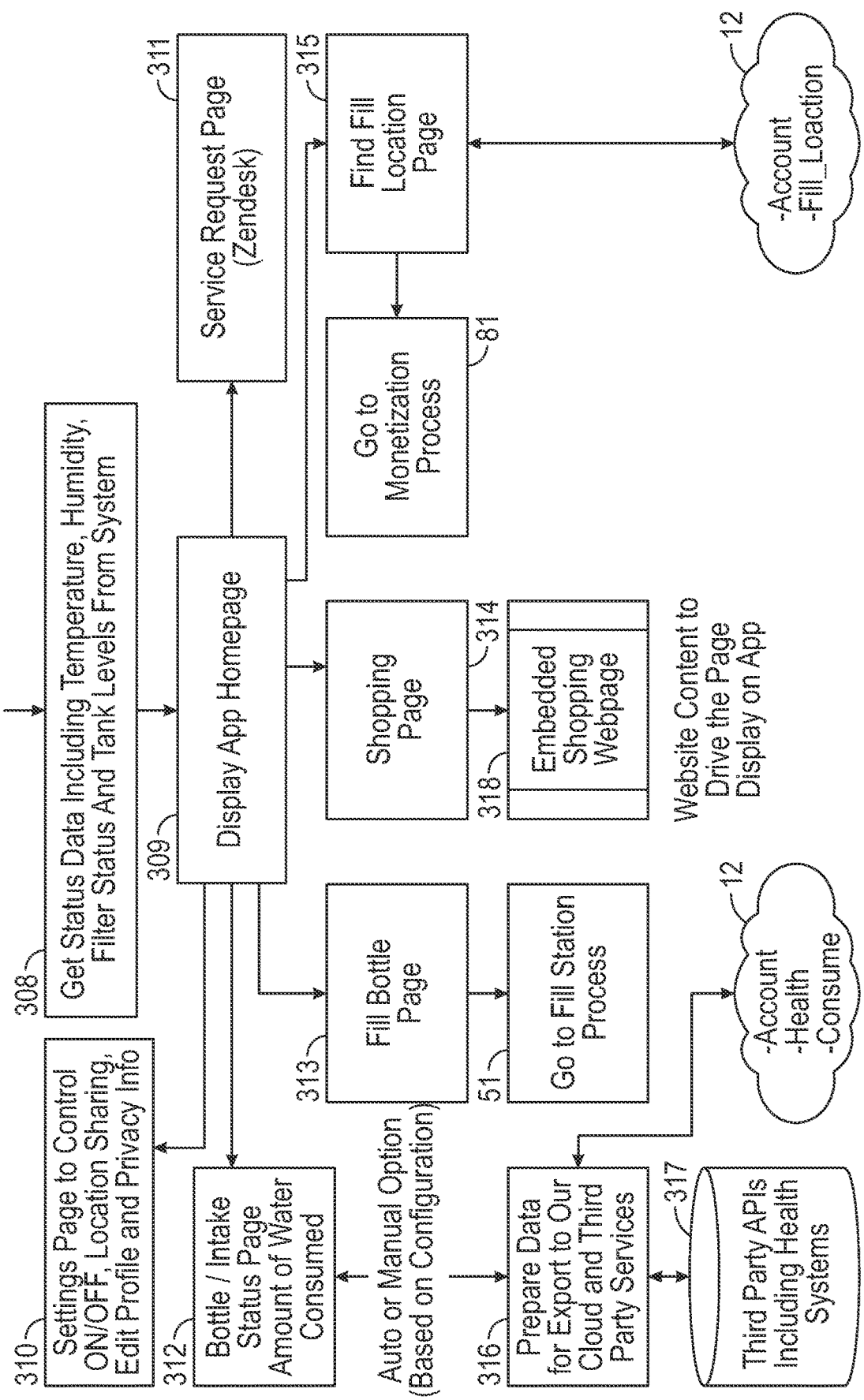

FIGS. 5A-5B are flow charts of a method 300 of filling and dispensing a liquid according to an exemplary embodiment of the present disclosure. In an embodiment, the method 300 may be a computer implemented method. In an embodiment, the method 300 may be a non-transitory computer-readable storage medium storing instructions which, when executed by a computer processor, cause a computer processor to perform the liquid filling and dispensing method. In an embodiment, the method 300 may be a mobile device application ("mobile app") which may be run on a mobile phone, for example.

Figure 9:
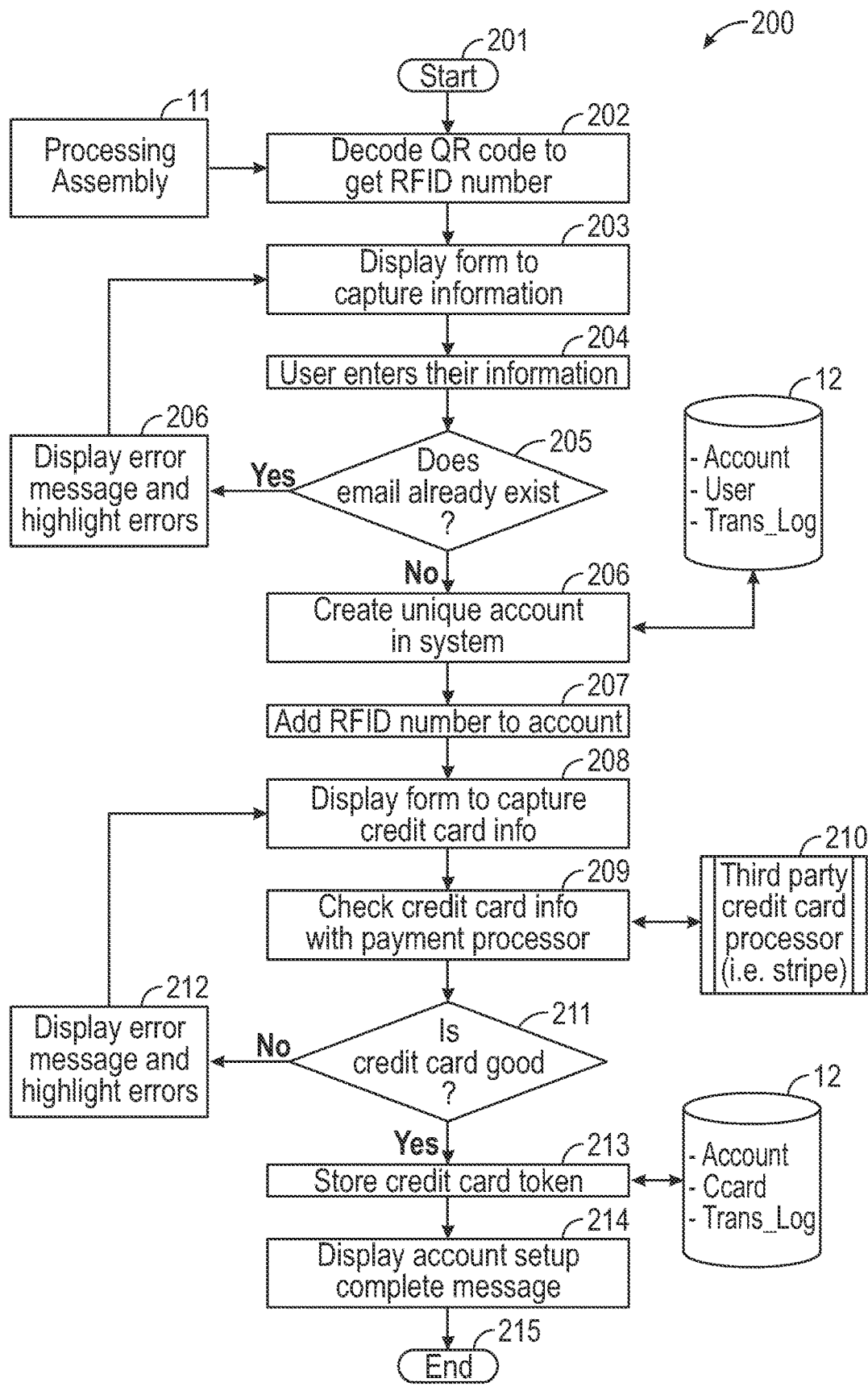
FIG. 9 is a flow chart of a user account setup process according to an exemplary embodiment of the present disclosure.

In an embodiment, the method 300 may start at 301, such as a home page of a mobile app. At 302, a user may indicate whether the user has an account for the mobile app. If "no", then at 201, the user may start to set up an account according to a method 200 (FIG. 9). If "yes", then at 303, the user may enter log in information, such as name, email, and password. At 304, the method 300 may determine whether the log in information is for a valid user account based on information in a cloud-based database 12. In an embodiment, an Account table 401, a User table 402, and a Pass table 403 of the database 12 (FIGS. 6A, 6B, and 6C further described below) can be used to validate the log in information.

At 304, if "no", then return to 303. If "yes", then proceed to 305 to reset a password or to 306 to wirelessly connect, such as by Bluetooth, to the processing assembly 11.

At 306, if there is a failed connection, then at 307, an error message may be displayed and enable the user to retry connecting. If there is a successful connection, then at 308, the user may be enabled to obtain operating parameters of the processing assembly 11. For example, operating parameters may include temperature, humidity, filter status, and tank levels. In an embodiment, an Account table 401 of the database 12 (FIG. 6A further described below) can be used to obtain the operating information which may receive sensor information from sensor(s) in the processing assembly.

Thereafter, at 309, the user may proceed to 310 at which the user may adjust settings, such as on/off, location sharing, user profile, and privacy information. One or more of the foregoing settings may be stored in the database 12.

At 309, the user may proceed to 311 at which the user may request help, such as through a third-party customer service program, like Zendesk™.

From 309, the user may select among a plurality of user actions. In embodiments, the user actions may include, at 312, obtaining information about the amount of liquid previously consumed from the container. The user actions may include, at 313, initiating the filling of liquid into the container. The user actions may include, at 314, shopping for and purchasing items related to the processing assembly 11, the filling assembly 13, and/or the container 34. The user actions may include, at 315, finding a fill location (i.e., a geographical location) having the filling assembly 13.

If 312 is selected, then at 316, the information obtained may be sent to the cloud storage 14 or a third party. If to be sent to a third party, then at 317, the information may be sent via a third-party application programming interface. In an embodiment, a Consume table 407 of the database 12 (FIG. 6G further described below) can be used to access the information to be sent.

Figure 7A:
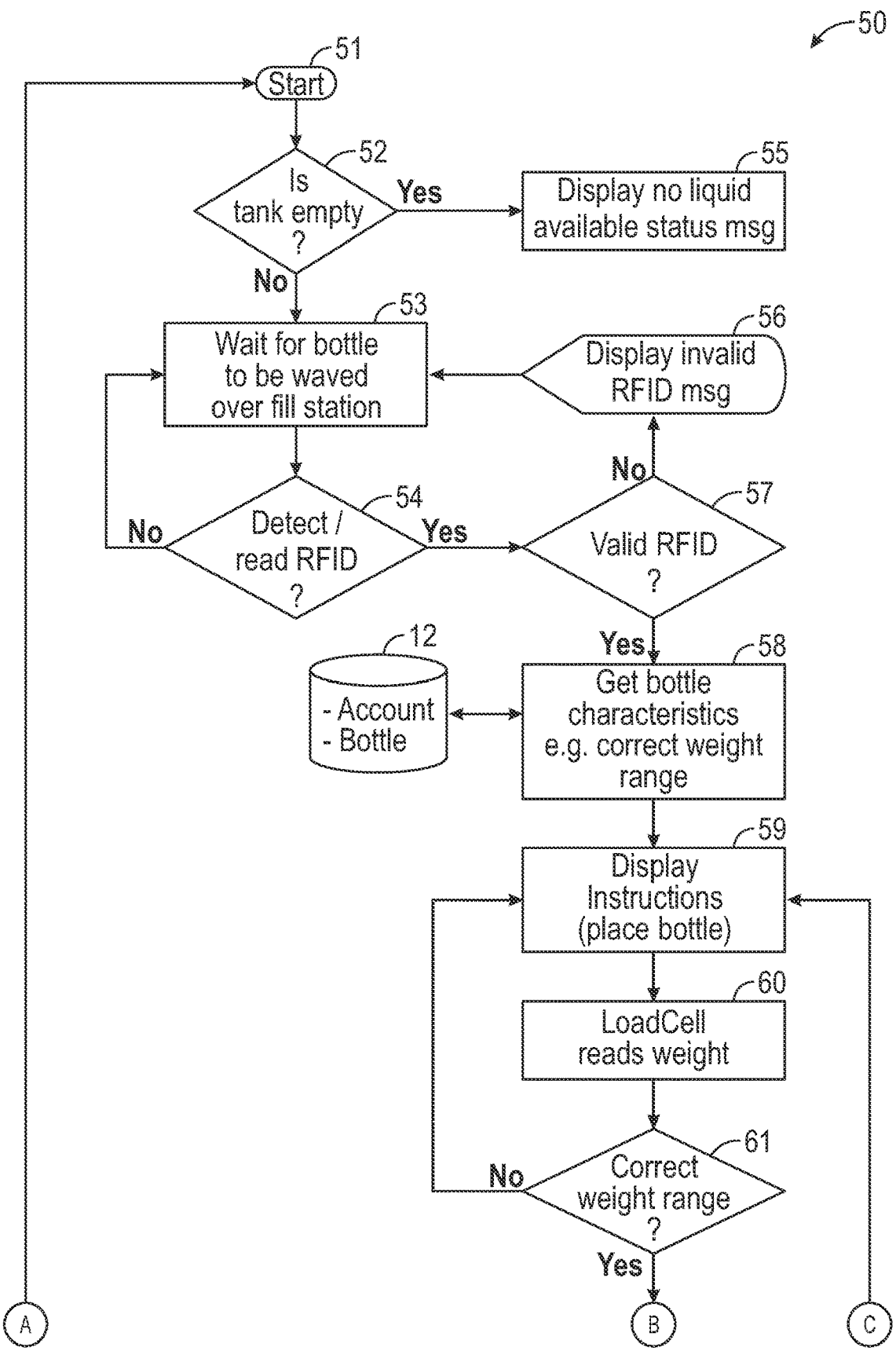
FIGS. 7A-7B are flow charts of a filling process according to an exemplary embodiment of the present disclosure.
Figure 7B:
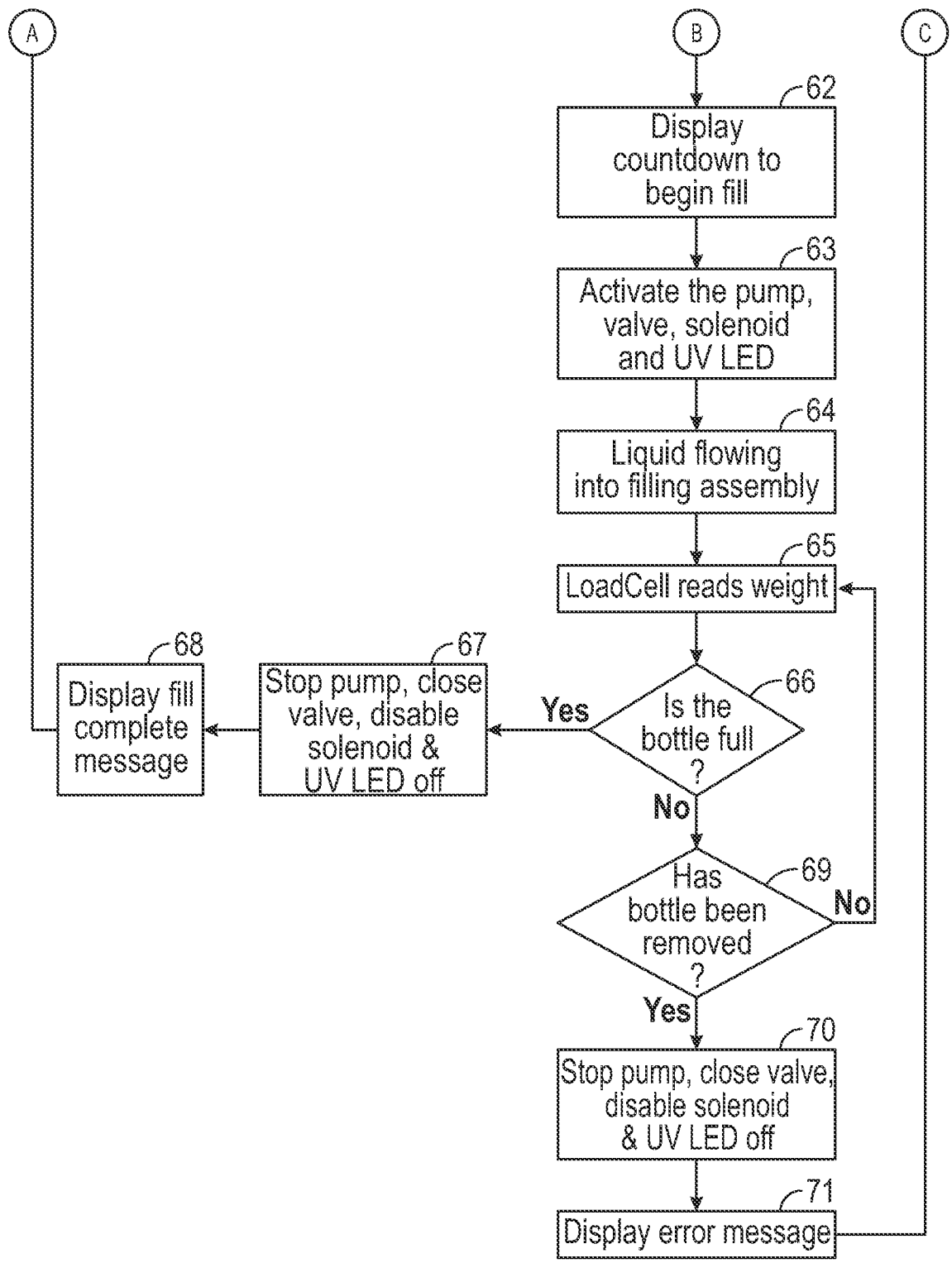

If 313 is selected, the method 300 can proceed to 51 whereby the user can initiate a method 50 of filling the container 34 with the liquid at the filling assembly 13 (FIGS. 7A-7B further described below). In an embodiment, the filling assembly 13 can be located at a private only accessible fill location. In other words, the fill location can be at a non-public location, such as the user's vehicle that the public does not generally access.

If 314 is selected, the method 300 can proceed to 318 where the user can be enabled to shop at an e-commerce website.

If 315 is selected, the method 300 can enable the user to geographically find a fill location where a filling assembly 13 is located. In an embodiment, the filling assembly 13 can be located at a publicly accessible fill location. In other words, the fill location can be at a public location, such as a hotel or restaurant. At 315, the user may find a fill location by accessing the Account table 401 and a Fill_Location table 409 of the database 12 (FIGS. 6A and 6I further described below).

Figure 8A:
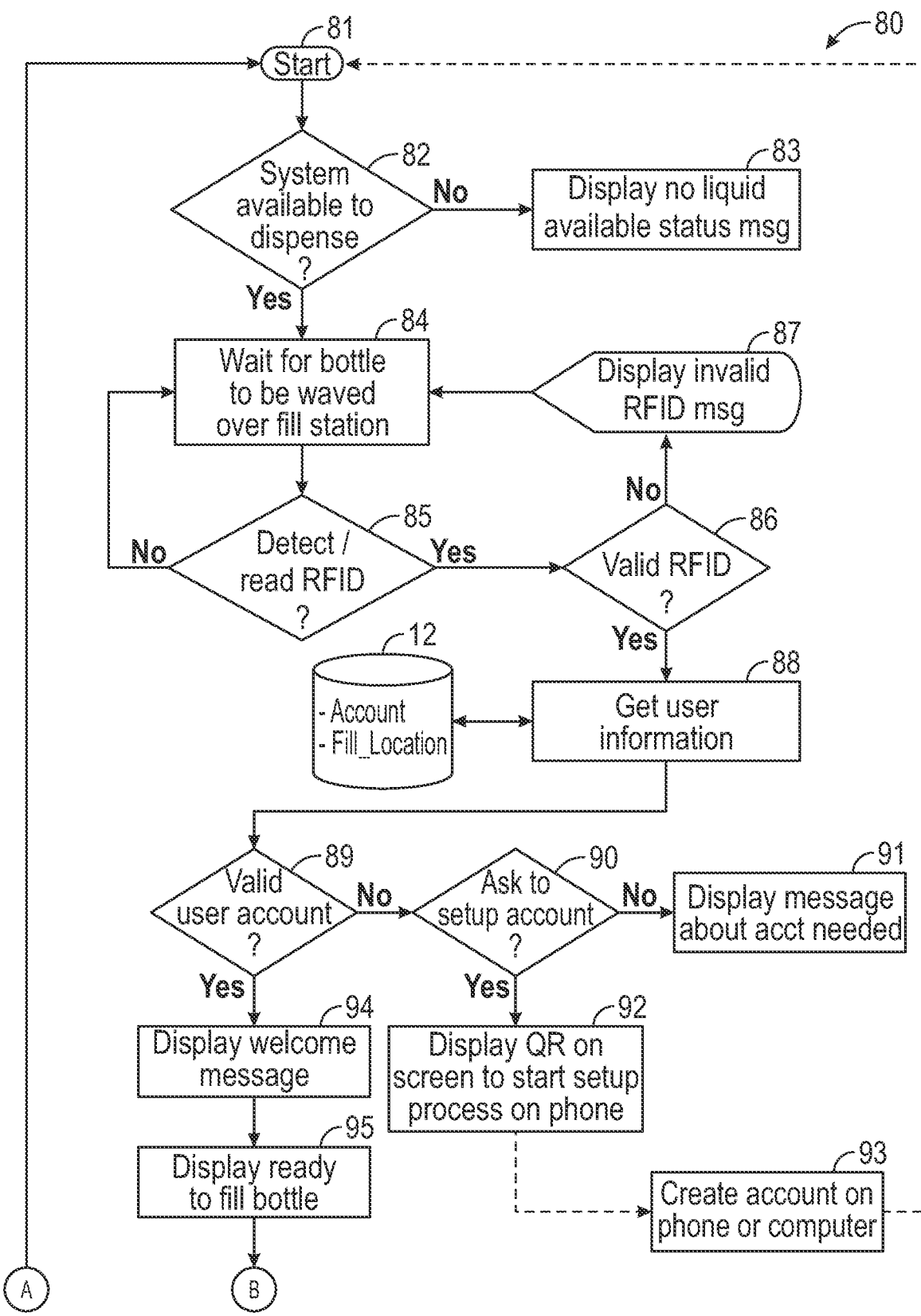
FIGS. 8A-8B are flow charts of a monetization process according to an exemplary embodiment of the present disclosure.
Figure 8B:
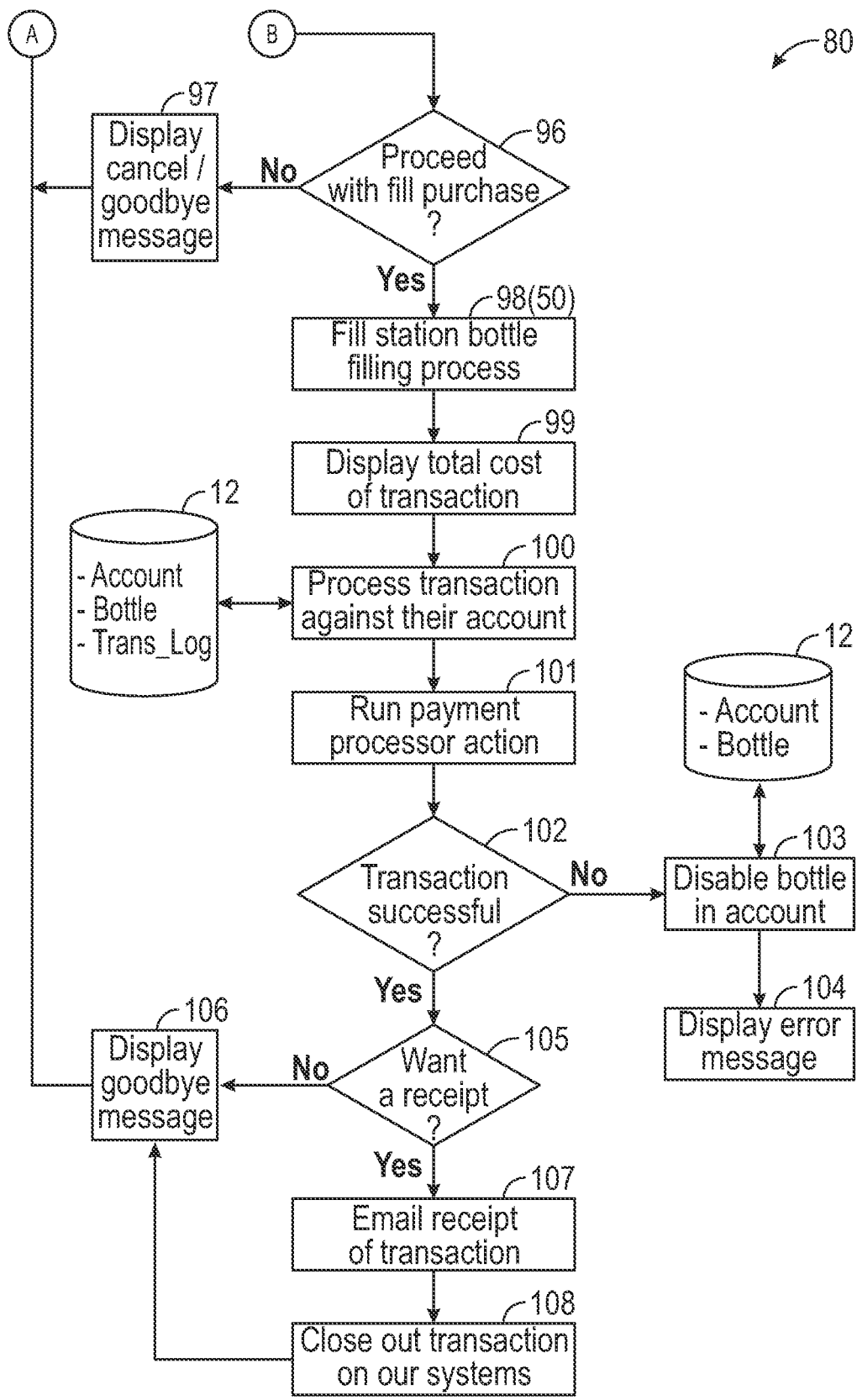

From 315, the method 300 can proceed to 81 that can enable a user to proceed through a monetization method 80 (FIGS. 8A-8B further described below). In an embodiment, the method 80 can include the filling method 50.

As mentioned above, in an embodiment, the database 12 can include a plurality of tables. As shown in FIGS. 6A-6I, the tables may include Account table 401, User table 402, Pass table 403, CCard table 404, Trans_Log table 405, Bottle table 406, Consume table 407, Health table 408, and Fill_Location table 409.

In FIG. 6A, according to an embodiment, the Account table 401 may consolidate data from the other tables in the database 12. The Account table 401 may have columns for a "key" that can include data that represents a unique user. The Account table may have, as examples, rows for "userID", "passID", "cardID", "bottleID" "awgID", "awgStatus", and "healthID". The userID may include user name data of the unique user. The passID may include password data of the unique user. The cardID may include credit card data of the unique user. The bottleID may include physical characteristic data of the container of the unique user. The awgID may include processing assembly 11 data associated with the unique user. The health ID may include liquid consumption data for the container of the unique user.

In FIG. 6B, according to an embodiment, the User table 402 may have columns for the "key" in the Account table 401. The User table may have, as examples, rows for the "userID" in the Account table 401, "firstname", "lastname", "addr1", "addr2", "city", "state", "zip", "phone", "email", the "passID" in the Account table 401, "date_created", and "status". The foregoing going rows may include data of the unique user. For example, the "status" may include data about recent activity to show if account is valid, disabled or flagged for possible fraud, etc of the unique user.

In FIG. 6C, according to an embodiment, the Pass table 403 may have columns for the "key" in the Account table 401. The Pass table may have, as examples, rows for the "passID" in the Account table 401, "status", "pass_id", "last_activity-date", and "expire_date". The foregoing going rows may include data of the unique user. For example, the "status" may include data about recent activity to show if account is valid, disabled, flagged due to suspicious activity, etc of the unique user. The "pass_id" may include data about corresponding record containing the encrypted password for the account of the unique user.

In FIG. 6D, according to an embodiment, the CCard table 404 may have columns for the "key" in the Account table 401. The CCard table may have, as examples, rows for the "userID" in the Account table 401, "status", "token_id", "card_id" in the Account table 401, "card_type", "last_activity_date", and "expire_date". The foregoing going rows may include data of the unique user. For example, the "status" may include data about recent activity to show if account is valid, disabled, flagged due to suspicious activity, etc. of the unique user. For example, the "token_id" may include data about unique information matching stored values to use for future credit card processing without disclosing actual credit card information of the unique user.

In FIG. 6E, according to an embodiment, the Transaction_Log table 405 may have columns for the "key" in the Account table 401. The Transaction_Log table may have, as examples, rows for the "userID" in the Account table 401, "card_id" in the Account table 401, "location_id", and "transaction_type". The foregoing going rows may include data of the unique user. For example, the "location_id" may include data about referencing the specific location record store in the "Fill_LocationsDB" of the unique user. For example, the "transaction_type" may include data about the type of service associated with the transaction for example refill bottle, purchase new bottle, refund, etc of the unique user.

In FIG. 6F, according to an embodiment, the Bottle table 406 may have columns for the "key" in the Account table 401. The Bottle table may have, as examples, rows for the "userID" in the Account table 401, "rfid_code", "bottle_type", "fill_cap", and "status". The foregoing going rows may include data of the unique user. For example, the "rfid_code" may include data about a unique identification number stored with the RFID chip found on the bottom of the bottle of the unique user. For example, the "bottle_type" may include data about specific characteristics of the bottle including revision of bottle design, value designs, etc of the unique user. For example, the "fill_cap" may include data about how much liquid (calaculated based on volume of water) the bottle can store of the unique user. For example, the "status" may include data about recent activity to show if account is valid, disabled or flagged as missing, stolen, etc of the unique user.

In FIG. 6G, according to an embodiment, the Consume table 407 may have columns for the "key" in the Account table 401. The Consume table may have, as examples, rows for the "userID" in the Account table 401, "transdate", and "consume". The foregoing going rows may include data of the unique user. For example, the "consume" may include data about how much liquid was previously consumed from the container of the unique user.

In FIG. 6H, according to an embodiment, the Health table 408 may have columns for the "key" in the Account table 401. The Health table may have, as examples, rows for the "userID" in the Account table 401, "transdate", "consumeID", "healthID" in the Account table 401, "healthName", and "url". The foregoing going rows may include data of the unique user. For example, the "consumeID" may include data about which record is associated with this user from the ConsumeDB of the unique user. For example, the "healthID" may include data about the Identification number used by third party accounts and system that correspond to the unique user. For example, the "health Name" may include data about third party service associated with the of the unique user. For example, the "url" may include data about website address for the third-party service provider for their health storage system of the unique user.

In FIG. 6I, according to an embodiment, the Fill_Locations table 409 may have columns for the "key" in the Account table 401. The Fill_Locations table may have, as examples, rows for the "locnID", "locnname", "locn_displayname", "ownerID" in the Account table 401, "addr1", "addr2", "city", "state", "zip", "status", "locn_lat", and "locn_long". The foregoing going rows may include data of publicly accessible fill locations having a fill assembly. For example, the "locnID" may include data about referencing the specific location record store in the "Fill_LocationsDB" of the unique fill location. For example, the "locnname" may include data about a unque identification text reference of the unique fill location. For example, the "ownerID" may include data about the individual that owns the Fill Station that is located at that location of the unique fill location. For example, the "status" may include data about ability to provide filling capabilities, recent activity to show location is valid, disabled, etc of the unique fill location.

As mentioned above, the method 300 may include the filling method 50. Accordingly, the method 50 may be a computer implemented method. In an embodiment, the method 50 may be a non-transitory computer-readable storage medium storing instructions which, when executed by a computer processor, cause a computer processor to perform the filling method. In an embodiment, the method 50 may be a mobile device application ("mobile app") which may be run on a mobile phone, for example.

FIGS. 7A-7B are flowcharts that depict the filling method 50 according to an embodiment.

At block 51, the system 10 can be powered on (such as by a power switch in the processing assembly 11). At block 52, determine whether the collection tank 21 is empty (such as by a sensor in the tank 21). If yes, then at block 55, display a "no liquid available" message on the user device 15. If no, then at block 53, wait for a container 34 to be operatively adjacent to the filling assembly 13.

At block 54, detect and read an RFID tag 34*e* on the container 34. If none detected, return to block 53. If detected, then at block 57, determine whether the RFID tag is valid (such as from the Account table 401 and the Bottle table 406 of the database 12). If not valid, at block 56, display an "invalid" message on the user device. If valid, at block 58, obtain physical characteristics of the container 34 (e.g., correct weight range)(such as from the Account table 401 and the Bottle table 406).

Following block 58, at block 59, display "place container in holder" message on the user device. At block 60, the load cell 39 measures the weight of the container 34. At block 61, compare measured weight against valid weight ranges. If not valid, then return to block 59. If valid, at block 62, start countdown to start of filling liquid. At block 63, activate the pump 25, the valve 26, the solenoid(s) 50, and the UV-LED 40. At block 64, liquid is flowing from the processing assembly 11 and into the filling assembly 13.

At block 65, the load cell 39 measures the weight of the container 34. At block 66, determine whether the container 34 is full of water by comparing an empty weight to a full weight (such as from the Account table 401 and the Bottle table 406). If yes, then at block 67, stop the pump 25, close the valve 26, disable the solenoid (s) 50, and turn off the UV-LED 40. At block 68, display "fill complete" message on the user device, and then return to the start 51. If not full, then at block 69, determine whether the container 34 has been removed from the filling assembly 13 (such as by a sudden change in the reading from the load cell 39).

In an embodiment, a "sudden change" may be as follows. The load cell 39 may continually monitor the weight of the container 34 during the filling process. As the filling process is somewhat linear, the expected weight change can be determined and monitored while filling. The weight readings can occur about 30-35 times a second. If, during the filling process, there is a different result, the controller 12 and/or 36 can note a "bad" reading, starting a process that will check for up to two more bad readings in succession. If this occurs, the controller 12 and/or 36 can assume that something has gone wrong and can stop the filling process by closing the valve 26 and switching off the pump 25. If the bad readings do not reach the three-result threshold, the controller 12 and/or 36 can reset and continue as normal.

If the container 34 has not been removed, then return to block 65, If yes, then stop pump 25, close the valve 26, disable the solenoid(s) 50, and turn off the UV-LED 40. Next, at block 71, display "error" message on the user device, and return to block 59.

As mentioned above, the method 300 may include the monetization method 80. Accordingly, the method 80 may be a computer implemented method. In an embodiment, the method 80 may be a non-transitory computer-readable storage medium storing instructions which, when executed by a computer processor, cause a computer processor to perform the filling method. In an embodiment, the method 80 may be a mobile device application ("mobile app") which may be run on a mobile phone, for example.

FIGS. 8A-8B are flowcharts that depict the monetization method 80 according to an embodiment.

At block 81, the system 10 can be powered on (such as by a power switch in the processing assembly 11). At block 82, determine whether the system 10 is available to dispense liquid to third persons (such as by reading the setting in the database 12 of the users the owner wishes to allow liquid to be available). If no, then at block 83, display a "no liquid available" message on the user device. If yes, then at block 84, wait for a container 34 to be operatively adjacent to the filling assembly 13.

At block 85, detect and read an RFID tag 34*e* on the container 34. If none detected, return to block 84. If detected, then at block 86, determine whether the RFID tag is valid (such as from the Account table 401 and the Fill_Location table 6I of the database 12). If not valid, at block 87, display an "invalid" message on the user device. If valid, at block 89, obtain user information (such as from the Account table 401 and the Fill_Location table 6I of the database 12).

At block 89, determine whether the user has a valid user account (such as from the Account table 401 and the Fill_Location table 6I of the database 12). If no valid user account, at block 90, display message "set up account?" on the user device. If no, at block 91, display message "account needed" on the user device. If yes, at block 92, display screen to start set up process with user device 15.

At block 89, if yes to having a valid user account, then at block 94, display message "welcome" on the user device. Then at block 95, display message "ready to fill bottle" on the user device. At block 96, display message "proceed to purchase?" on the user device. If no, then at block 97, display message "cancel/goodbye" on the user device, and the process returns to block 81. If yes, then at block 98, the bottle filling process starts (such as that described in process 50).

At block 99, display message of total cost of purchase on the user device. At block 100, process the purchase against the valid user account. At block 101, run payment processor action. At block 102, determine if purchase is successful. If no, at block 103, disable container in user account and then at block 104, display message "error" on the user device.

If purchase is successful, at block 105, display message "want a receipt" on the user device. If no, at block 106, display message "goodbye" on the user device and return to block 81. If yes, at block 107, email receipt of purchase to user In embodiments, blocks 99 through 107 may be implemented by any suitable e-commerce program that enables a user to purchase a product/service online.

At block 108, close out transaction in any suitable accounting system that can remote from the system 10, and then continue to blocks 106 and 81.

As mentioned above, the method 300 may include the set up account method 200. Accordingly, the method 200 may be a computer implemented method. In an embodiment, the method 200 may be a non-transitory computer-readable storage medium storing instructions which, when executed by a computer processor, cause a computer processor to perform the filling method. In an embodiment, the method 200 may be a mobile device application ("mobile app") which may be run on a mobile phone, for example.

FIG. 9 is a flowchart that depicts the set-up account method 200 according to an embodiment.

In an embodiment, at block 201, the method may start. At block 202, the user device 15 decodes a QR code from the processing assembly 11 to get an RFID number. (If the user does not have a QR code, the user can manually populate a form.) At block 203, display a form on the user device 15 to capture user information. At block 204, user enters information. At block 205, determine if user email already exists in the database 12. If yes, at block 206, display error message and return to block 203. If no, create unique account in the database 12 (such as in the Account table 401, the User table 402, and the Transaction_Log 405).

At block 207, add RFID number from above to account. At block 208, display a form on the user device to capture credit card information (which can be stored in the CCard table 404). At block 209, verify credit card information with payment processor. At block 210, credit card processor uses credit card stripe. At block 211, is credit card good? If no, at block 212, display error message and then return to block 208. If yes, at block 213, store credit card token in the CCard table 404. At block 214, display message that setup is complete and, at block 215, end process, such as by continuing in the monetization process 80. In an embodiment, the process 200 may continue at block 94 of the monetization process 80.

It should be understood, of course, that the foregoing relates to exemplary embodiments of the disclosure and that modifications may be made without departing from the spirit and scope of the disclosure as set forth in the following claims.

We claim:

1. A non-transitory computer-readable storage medium storing instructions which, when executed by a computer processor, cause the computer processor to perform a liquid filling and dispensing method, comprising:
    enabling a user to find a fill location having a filling assembly, wherein the fill assembly is configured to fill a container with liquid; and
    enabling the user to initiate filling of the container at the filling assembly with liquid that passes from outside of the container and through a bottom area of the container;
    wherein filling includes moving a ball bearing in the filling assembly and 10 towards the container.

2. The method of claim 1, wherein:
    the found fill location is a among publicly accessible fill locations and private only accessible fill locations identified in a fill location table.

3. The method of claim 1, wherein the bottom area of the container is opposite a top area of the container from which the user can consume the liquid.

4. The method of claim 1, further comprising:
    determining whether a user has an account that is valid.

5. The method of claim 1, further comprising:
    determining whether information on the container is valid before filling the container with the liquid.

6. The method of claim 1, further comprising:
    determining a weight of the container before and during the filling of the container with the liquid.

7. A computer implemented method for liquid filling and dispensing, comprising:
    enabling a validated user to select a user action among:
        finding a fill location having a filling assembly, wherein the fill assembly is configured to fill a validated container with liquid; and
        initiating the filling of the container at the filling assembly with liquid that passes from outside of the container and through a bottom area of the container;
        wherein filling includes moving a ball bearing in the filling assembly and towards the container.

8. The method of claim 7, wherein the user action further comprises:
    enabling the user to determine an amount of liquid previously consumed from the container.

9. The method of claim 7, wherein the user action further comprises:
    enabling the user to purchase items associated with the processing assembly, the filling assembly, and the container.

10. The method of claim 7, further comprising:
    comparing data on an RFID tag that is on the container to a database having data of valid containers.

11. The method of claim 7, further comprising:
    determining a weight of the container before and during the filling of the container with the liquid.

12. The method of claim 7, further comprising:
    obtaining physical characteristics of the container.

* * * * *